(12) United States Patent
Ryo

(10) Patent No.: US 12,423,036 B2
(45) Date of Patent: Sep. 23, 2025

(54) IMAGE FORMING APPARATUS AND METHOD WITH DIVIDER REGION FOR DIVIDING ROLL-SHAPED PRINTING MEDIUM INTO OBTAINED NUMBER OF ROLLS

(71) Applicant: CANON KABUSHIKI KAISHA, Tokyo (JP)

(72) Inventor: Cho Ryo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 18/157,857

(22) Filed: Jan. 23, 2023

(65) Prior Publication Data
US 2023/0242363 A1 Aug. 3, 2023

(30) Foreign Application Priority Data
Jan. 28, 2022 (JP) .................... 2022-012025

(51) Int. Cl.
*G06F 3/12* (2006.01)
*G06K 15/00* (2006.01)
*G06K 15/02* (2006.01)

(52) U.S. Cl.
CPC .......... *G06F 3/1251* (2013.01); *G06F 3/1208* (2013.01); *G06F 3/1219* (2013.01); *G06F 3/1256* (2013.01); *G06K 15/024* (2013.01); *G06K 15/1868* (2013.01); *G06K 15/4065* (2013.01); *G06F 3/1284* (2013.01)

(58) Field of Classification Search
CPC .... G06F 3/1251; G06F 3/1208; G06F 3/1219; G06F 3/1256; G06F 3/1284; G06K 15/024; G06K 15/1868
See application file for complete search history.

(56) References Cited

U.S. PATENT DOCUMENTS

| | | | | |
|---|---|---|---|---|
| 2014/0153004 A1* | 6/2014 | Tufano | ................. | G06F 3/1219 358/1.2 |
| 2014/0300734 A1* | 10/2014 | Binetruy | ................. | H04N 7/18 348/135 |
| 2015/0212771 A1* | 7/2015 | Hori | ..................... | G06K 15/022 358/1.18 |
| 2017/0091603 A1* | 3/2017 | Kikumoto | ............ | G06K 15/005 |
| 2019/0004754 A1* | 1/2019 | Honda | .................. | G06F 3/1282 |
| 2019/0149676 A1* | 5/2019 | Hori | .................. | H04N 1/00665 358/1.18 |
| 2019/0217640 A1* | 7/2019 | Marchesin | ........... | G06K 15/022 |

(Continued)

FOREIGN PATENT DOCUMENTS

JP 2018-202754 A 12/2018

*Primary Examiner* — Nicholas Pachol
(74) *Attorney, Agent, or Firm* — Venable LLP

(57) ABSTRACT

An image forming apparatus, comprises: a setting unit configured to set a divider region in a group of images that are continuously printed during feeding from a feeding apparatus in which a roll-shaped printing medium has been set, the divider region being for separating the roll-shaped printing medium into a plurality of rolls. The setting unit sets the divider region based on the number of rolls indicating the count of the plurality of rolls, the number of rolls being required in terms of a configuration of a post-processing device that executes post-processing with respect to the roll-shaped printing medium on which printing has been performed by the printing unit.

16 Claims, 19 Drawing Sheets

(56) References Cited

U.S. PATENT DOCUMENTS

| | | | |
|---|---|---|---|
| 2019/0361646 A1* | 11/2019 | Hori | H04N 1/00456 |
| 2019/0361649 A1* | 11/2019 | Hori | H04N 1/0044 |
| 2020/0081674 A1* | 3/2020 | Fukami | G06F 3/1205 |
| 2020/0142655 A1* | 5/2020 | Ogaki | G06F 3/121 |
| 2021/0389917 A1* | 12/2021 | Matsuda | G06F 3/1204 |
| 2022/0111672 A1* | 4/2022 | Jacques | B41F 33/00 |
| 2024/0169174 A1* | 5/2024 | Ryo | G06F 3/1251 |

\* cited by examiner

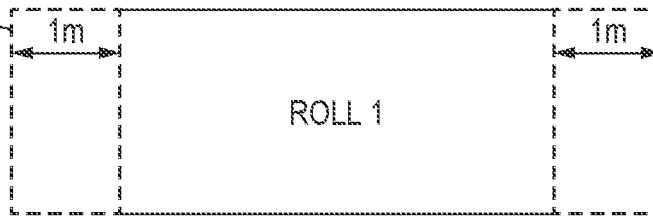

FIG. 4B

| DIVIDER INFORMATION SETTING SCREEN | | | | | |
|---|---|---|---|---|---|
| DOCUMENT NAME | NUMBER OF PAGES | NUMBER OF COPIES | NUMBER OF ROLLS | DIVIDER FUNCTION | ON ▢ —402 |
| Document1 | 500 | 1 | 2 | DIVIDER CONDITION | OFF ▽ —403 |

401 — (row highlighted)

DIVIDER LENGTH: 1.0 m —404

405 — Diagram:
- 1m | 1m | 1m | 1m
- ROLL 1 | ROLL 2
- NUMBER OF PAGES: 1-250, ROLLS: 1/2
- NUMBER OF PAGES: 1-250, ROLLS: 1/2
- NUMBER OF PAGES: 251-500, ROLLS: 2/2
- NUMBER OF PAGES: 251-500, ROLLS: 2/22

| ROLL | NUMBER OF PAGES | |
|---|---|---|
| | START | END |
| 1 | 1 | 250 |
| 2 | 251 | 500 |

—409

< 1 >

[Save] [Cancel]

FIG. 4C

| DIVIDER INFORMATION SETTING SCREEN | | | | | |
|---|---|---|---|---|---|
| DOCUMENT NAME | NUMBER OF PAGES | NUMBER OF COPIES | NUMBER OF ROLLS | DIVIDER FUNCTION | ON ▢ |
| Document2 | 2 | 500 | 3 | DIVIDER CONDITION | OFF ▽ |

401 —

DIVIDER LENGTH: 1.0 m

405 — Diagram:
- 1m | 1m | 1m | 1m
- ROLL 1 | ROLL 2
- NUMBER OF COPIES: 1-167, NUMBER OF PAGES: 1-334, ROLLS: 1/3
- NUMBER OF COPIES: 1-167, NUMBER OF PAGES: 1-334, ROLLS: 1/3
- NUMBER OF COPIES: 168-335, NUMBER OF PAGES: 335-670, ROLLS: 2/3
- NUMBER OF COPIES: 168-335, NUMBER OF PAGES: 335-670, ROLLS: 2/3

| ROLL | NUMBER OF COPIES | |
|---|---|---|
| | START | END |
| 1 | 1 | 167 |
| 2 | 168 | 335 |
| 3 | 336 | 500 |

—409

< 1 >

[Save] [Cancel]

F I G. 5C

| DIVIDER INFORMATION SETTING SCREEN |||||
|---|---|---|---|---|
| DOCUMENT NAME | NUMBER OF PAGES | NUMBER OF COPIES | NUMBER OF ROLLS ||
| Document2 | 2 | 500 | 3 ||

405

1m | 1m | 1m | 1m
ROLL 1 | ROLL 2

NUMBER OF PAGES: 1-300
PRINT LENGTH: 89100 mm
ROLLS: 1/3

NUMBER OF PAGES: 1-300
PRINT LENGTH: 89100 mm
ROLLS: 1/3

NUMBER OF PAGES: 301-600
PRINT LENGTH: 89100 mm
ROLLS: 2/3

NUMBER OF PAGES: 301-600
PRINT LENGTH: 89100 mm
ROLLS: 2/3

< 1 >

DIVIDER FUNCTION  ON
DIVIDER CONDITION  403
PRINT LENGTH ▽
DIVIDER LENGTH  1.0 m
409

| ROLL | NUMBER OF PAGES || PRINT LENGTH (mm) |
|---|---|---|---|
| | START | END | |
| 1 | 1 | 300 | 89100 |
| 2 | 301 | 600 | 89100 |
| 3 | 601 | 1000 | 118800 |

[Save] [Cancel]

F I G. 5D

| DIVIDER INFORMATION SETTING SCREEN |||||
|---|---|---|---|---|
| DOCUMENT NAME | NUMBER OF PAGES | NUMBER OF COPIES | NUMBER OF ROLLS ||
| Document3 | 5000 | 1 | 2 ||

405

1m | 1m | 1m | 1m
ROLL 1 | ROLL 2

NUMBER OF PAGES: 1-2500
PRINT WEIGHT: 25.7 kg
ROLLS: 1/2

NUMBER OF PAGES: 1-2500
PRINT WEIGHT: 25.7 kg
ROLLS: 1/2

NUMBER OF PAGES: 2501-5000
PRINT WEIGHT: 25.7 kg
ROLLS: 2/2

NUMBER OF PAGES: 2501-5000
PRINT WEIGHT: 25.7 kg
ROLLS: 2/2

< 1 >

DIVIDER FUNCTION  ON
DIVIDER CONDITION  403
PRINT WEIGHT ▽
DIVIDER LENGTH  1.0 m
409

| ROLL | NUMBER OF PAGES || PRINT WEIGHT (kg) |
|---|---|---|---|
| | START | END | |
| 1 | 1 | 2500 | 25.7 |
| 2 | 2501 | 5000 | 25.7 |

[Save] [Cancel]

FIG. 13C

| PRINT SETTING | POST-PROCESSING DEVICE SPECIFICATION SETTINGS |

SHEET TYPE: PLAIN PAPER ▽
SHEET WIDTH: 280 mm

FINISHING SETTING
NUMBER OF PAGES: 4000
INTERVAL: 3 mm
NUMBER OF LANES: 2
OUTPUT METHOD: HEAD FIRST ▽

DIVIDER SETTING
DIVIDER LENGTH (FRONT AND REAR): 1 m
● SETTING OF NUMBER OF ROLLS: 4   ← 1303
○ CALCULATION FOR OPTIMAL NUMBER OF ROLLS
OPTIMAL NUMBER OF ROLLS:

PREVIEW

NUMBER OF PAGES: 1001-2000
PRINT LENGTH: 123000 mm
ROLLS: 2/4

120mm
130mm ← 3mm →

NUMBER OF PAGES: 1-1000
PRINT LENGTH: 123000 mm
ROLLS: 1/4

1m

ROLL 2 | ROLL 1
ROLL 4 | ROLL 3

1m

1304 ←

NUMBER OF PAGES: 3001-4000
PRINT LENGTH: 123000 mm
ROLLS: 4/4

< 1 >

NUMBER OF PAGES: 2001-3000
PRINT LENGTH: 123000 mm
ROLLS: 3/4

[ Save ]  [ Cancel ]

FIG. 14C

PRINT SETTING | POST-PROCESSING DEVICE SPECIFICATION SETTINGS

SHEET TYPE: PLAIN PAPER
SHEET WIDTH: 280 mm

FINISHING SETTING
- NUMBER OF PAGES: 4000
- INTERVAL: 3 mm
- NUMBER OF LANES: 2
- OUTPUT METHOD: HEAD FIRST

DIVIDER SETTING
- DIVIDER LENGTH (FRONT AND REAR): 1 m
- ○ SETTING OF NUMBER OF ROLLS: 1
- ● CALCULATION FOR OPTIMAL NUMBER OF ROLLS — 1306
- OPTIMAL NUMBER OF ROLLS: 4 — 1307

PREVIEW

120mm, 130mm, 3mm

NUMBER OF PAGES: 1001-2000
PRINT LENGTH: 123000 mm
ROLLS: 2/4

NUMBER OF PAGES: 1-1000
PRINT LENGTH: 123000 mm
ROLLS: 1/4

1m ← → | ← 1m →

1304 —
ROLL 2 | ROLL 1
ROLL 4 | ROLL 3

NUMBER OF PAGES: 3001-4000
PRINT LENGTH: 123000 mm
ROLLS: 4/4

NUMBER OF PAGES: 2001-3000
PRINT LENGTH: 123000 mm
ROLLS: 3/4

< 1 >

[Save] [Cancel]

FIG. 14D

| PRINT SETTING | POST-PROCESSING DEVICE SPECIFICATION SETTINGS |

✖ POST-PROCESSING DEVICE 1    ✖ POST-PROCESSING DEVICE 2    +

MAXIMUM ROLL DIAMETER: 200 mm

MAXIMUM ROLL LENGTH: 300 m

MAXIMUM ROLL WEIGHT: 3 kg

INNER DIAMETER OF SHEET CORE: 76 mm

THICKNESS OF SHEET CORE: 5 mm

CROSS-SECTIONAL AREA OF ROLL SHEET

MAXIMUM ROLL DIAMETER

INNER DIAMETER OF SHEET CORE

THICKNESS OF SHEET CORE

CROSS-SECTIONAL AREA OF ROLL SHEET

PAPER FEEDING LENGTH    MAXIMUM ROLL LENGTH    PAPER FEEDING LENGTH

IMAGE FORMING APPARATUS AND METHOD WITH DIVIDER REGION FOR DIVIDING ROLL-SHAPED PRINTING MEDIUM INTO OBTAINED NUMBER OF ROLLS

BACKGROUND

Field

The present disclosure relates to an image forming apparatus and a method that form an image on a roll-shaped printing medium.

Description of the Related Art

Label finisher systems, such as post-processing devices, that can execute processing from die cutting to take-up in one pass, for example, are known. In a label finisher system, restrictions related to the specifications of a roll sheet that can be processed, such as the maximum roll diameter, the maximum weight, and the maximum length, are required. For example, in the case of rewinding of a roll sheet with labels, a restriction on the external size of the roll sheet to be delivered is required so that the external size is equal to or less than the size that fits in an automatic label attachment device, such as a labeling machine.

Meanwhile, in a label roll printing factory, there is a task to divide a deliverable including a roll sheet into a plurality of rolls before delivery in accordance with a request provided by a user of a delivery destination about the external size of the roll sheet to be delivered and the number of rolls to be delivered (the quantity of rolls to be delivered).

For example, as shown in FIG. 10A, in a case where a deliverable including a roll sheet with images formed thereon is delivered as is, the diameter R1 of the roll sheet and the weight of the roll sheet exceed the restrictions, which bears the risk that the roll sheet cannot be set in an automatic label attaching device. For this reason, an operator needs to divide the deliverable including the roll sheet into a plurality of rolls before delivery in accordance with a request about the external size of the rolls to be delivered and the number of rolls to be delivered. For example, as shown in FIG. 10B, the operator divides the deliverable including the roll sheet into three rolls so that the resultant deliverables including the roll sheet each have a diameter of R2. In the dividing task, first, the length and the number of labels of the deliverable including the roll sheet are measured, and the deliverable including the roll sheet is cut and separated so as to meet the restriction on the external size of the rolls to be delivered. Next, certain blank sheets are joined so that the separated portions of the deliverable including the roll sheet, or the cut portions of the deliverable including the roll sheet, are taken up by sheet cores again. For example, with respect to the deliverables including the roll sheet that have been delivered to the user of the delivery destination in the foregoing manner, a post-processing device performs, for example, processing for die-cutting the portions in which a plurality of label images have been formed. Furthermore, for example, with respect to the deliverables including the roll sheet that have been delivered to the user of the delivery destination in the foregoing manner, the post-processing device may divide them into a plurality of rolls after performing processing for die-cutting the portions in which a plurality of label images have been formed.

It is mentioned in Japanese Patent Laid-Open No. 2018-202754 that, as a result of providing an optimal inter-job interval that becomes necessary in post-processing during the execution of printing processing, the occurrence of wasteful regions at the time of cutting of a continuous sheet is reduced.

SUMMARY

However, Japanese Patent Laid-Open No. 2018-202754 does not mention setting of a divider for performing a division into the number of rolls that is required in terms of the configuration of a post-processing device.

The present disclosure provides an image forming apparatus and a method that set a divider for performing a division into the number of rolls that is required in terms of the configuration of a post-processing device.

The present disclosure in one aspect provides an image forming apparatus, comprising: a setting unit configured to set a divider region in a group of images that are continuously printed during feeding from a feeding apparatus in which a roll-shaped printing medium has been set, the divider region being for separating the roll-shaped printing medium into a plurality of rolls; and a printing unit configured to print, on the printing medium fed from the feeding apparatus, the group of images in which the divider region set by the setting unit has been reflected, wherein the setting unit sets the divider region based on the number of rolls indicating the count of the plurality of rolls, the number of rolls being required in terms of a configuration of a post-processing device that executes post-processing with respect to the roll-shaped printing medium on which printing has been performed by the printing unit.

According to the present disclosure, a divider for performing a division into the number of rolls that is required in terms of the configuration of a post-processing device can be set.

Further features of the present disclosure will become apparent from the following description of exemplary embodiments with reference to the attached drawings.

BRIEF DESCRIPTION OF THE DRAWINGS

FIG. 3 is a diagram showing a print setting screen for a job list.

FIG. 4A to FIG. 4C are diagrams showing a divider information setting screen.

FIG. 5A to FIG. 5E are diagrams showing a divider information setting screen.

FIG. 13C is a diagram showing a layout setting screen.
FIG. 14C is a diagram showing a layout setting screen.
FIG. 14D is a diagram showing a layout setting screen.

DESCRIPTION OF THE EMBODIMENTS

Figure 1:
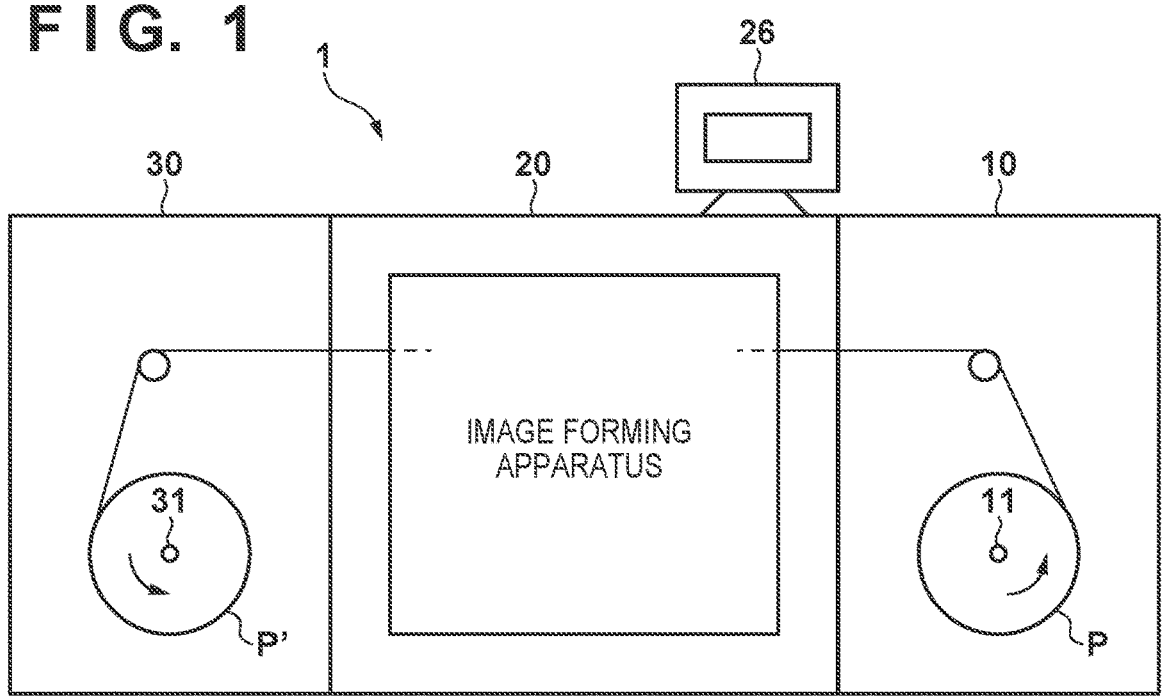
FIG. 1 is a diagram showing a schematic configuration of an image forming system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram showing an example of a schematic configuration of an image forming system 1 according to the present embodiment. The image forming system 1 is a system that forms images on a roll-shaped printing medium P on which continuous image formation can be performed (hereinafter referred to as a roll sheet (continuous sheet) as one example). The image forming system 1 is configured by connecting a feeding apparatus 10, an image forming apparatus 20, and a take-up apparatus 30 along the conveyance direction of the roll sheet P from the upstream side.

The feeding apparatus 10 is an apparatus that supplies the roll sheet P to the image forming apparatus 20. The feeding apparatus 10 causes a sheet core of the roll sheet P to rotate around a rotation shaft 11, and conveys the roll sheet P wound around the sheet core toward the image forming apparatus 20 at a constant speed via a plurality of rollers (e.g., conveyance rollers and feeding rollers).

The image forming apparatus 20 performs control to form images on the roll sheet P supplied from the feeding apparatus 10. The image forming apparatus 20 conveys the roll sheet P on which the images have been formed toward the take-up apparatus 30. In the present embodiment, the image forming apparatus 20 is, for example, a labeling apparatus in which a group of a plurality of labels (a group of images) is continuously printed in the feeding direction.

The take-up apparatus 30 is an apparatus that takes up the roll sheet P conveyed from the image forming apparatus 20 so that the roll sheet P has a rolled shape around a sheet core. In the take-up apparatus 30, for example, the roll sheet P is wound around the sheet core on a rotation shaft 31 and held while having a rolled shape as shown in FIG. 1. The take-up apparatus 30 takes up the roll sheet P, which has been rotated around the rotation shaft 31 and conveyed to the sheet core, as a deliverable P' including the roll sheet on the rotation shaft 31 at a constant speed via a plurality of rollers (e.g., conveyance rollers and discharge rollers).

Next, a control configuration of the image forming system 1 will be described in detail.

Figure 2:
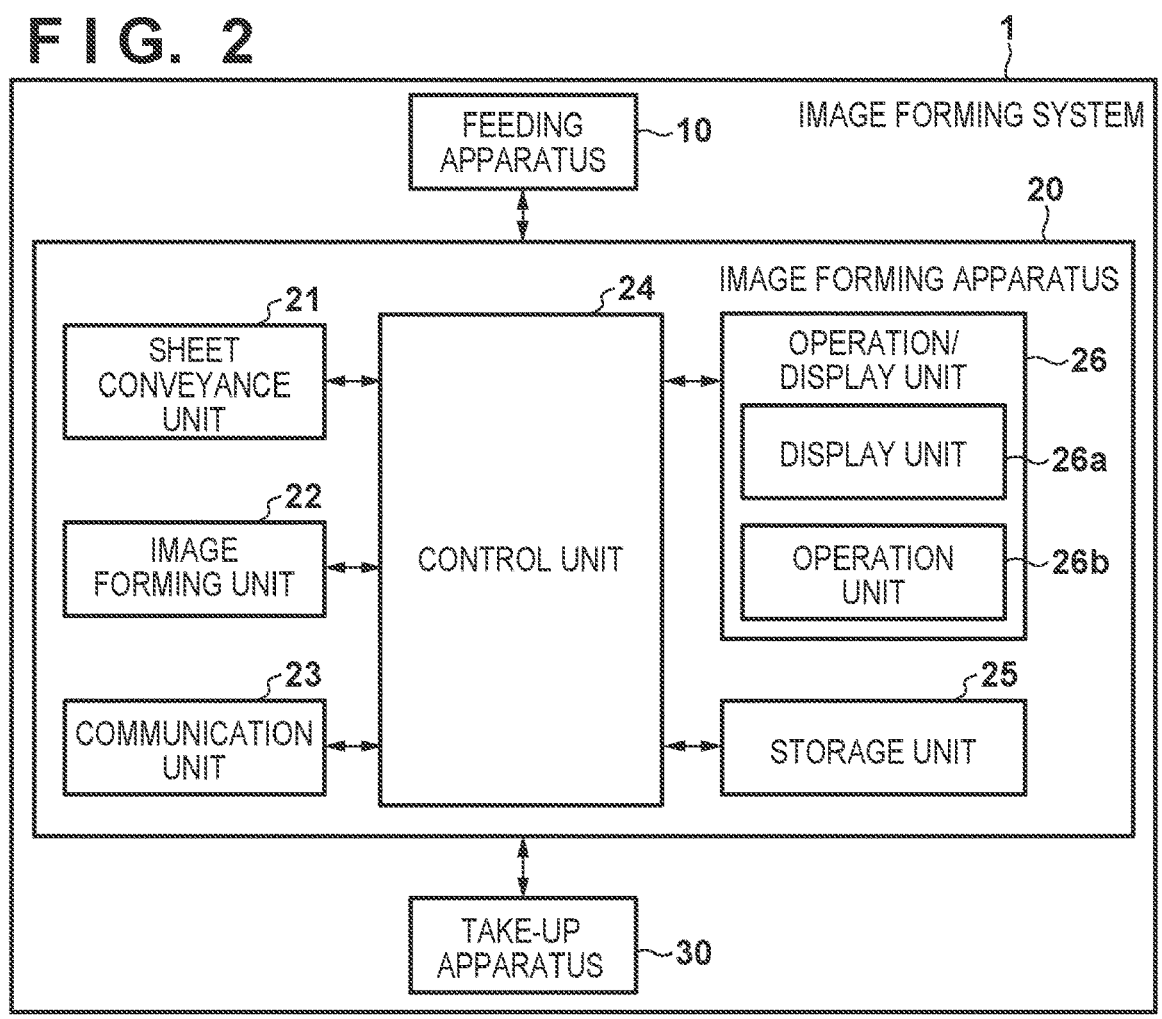
FIG. 2 is a functional block diagram showing a control configuration of the image forming system.

FIG. 2 is a functional block diagram showing the control configuration of the image forming system 1. In FIG. 2, the feeding apparatus 10 and the take-up apparatus 30 are shown as external apparatuses. As shown in FIG. 2, the image forming apparatus 20 includes, for example, a sheet conveyance unit 21, an image forming unit 22, a communication unit 23, a control unit 24, a storage unit 25, and an operation/display unit 26. These units are, for example, mutually connected in a communication-enabled manner via a bus and the like.

The sheet conveyance unit 21 is a mechanism for conveying the roll sheet P inside the image forming apparatus 20, and causes the roll sheet P conveyed from the feeding apparatus 10 to be conveyed to the image forming unit 22, and causes the roll sheet P that has passed through the image forming unit 22 to be conveyed to the take-up apparatus 30, via a plurality of rollers, for example.

Based on print data for which an output instruction has been received, the image forming unit 22 forms images on the roll sheet P supplied from the feeding apparatus 10. The roll sheet P on which the images have been formed by the image forming unit 22 is conveyed toward the take-up apparatus 30. The communication unit 23 is composed of, for example, a communication control card, such as a LAN (Local Area Network) card. Then, the communication unit 23 exchanges various types of data with an external apparatus (e.g., an information processing apparatus, such as a PC) connected to a communication network, such as a LAN and a WAN (Wide Area Network). Note that the communication network may be any of a wired network, a wireless network, and a network in which these networks coexist.

The control unit 24 is, for example, composed of a CPU (Central Processing Unit), a RAM (Random Access Memory), and the like, and integrally controls the image forming system 1. The CPU of the control unit 24 reads out various types of programs stored in the storage unit 25, such as a system program and a processing program, deploys the programs to the RAM, and executes various types of processing in accordance with the deployed programs. For example, the control unit 24 can perform image forming processing for executing an image forming job (hereinafter simply referred to as a job) in accordance with a user instruction. The storage unit 25 is composed of, for example, a nonvolatile semiconductor memory (e.g., a flash memory), an HDD (Hard Disk Drive), and the like. The storage unit 25 stores various types of programs executed by the control unit 24, such as a system program and a processing program, as well as various types of data that are necessary for the execution of these programs.

The operation/display unit 26 is composed of, for example, a liquid crystal display (LCD) equipped with a touch panel, and includes a display unit 26a and an operation unit 26b. The display unit 26a displays various types of information on a display screen in accordance with a display control signal input from the control unit 24. The operation unit 26b includes various types of operation keys, such as numerical keys and a start key, accepts various types of input operations made by a user, and outputs operation signals to the control unit 24. The operation/display unit 26 is used to, for example, set divider information at the time of the execution of a job.

Here, divider information is information that, in a case where the deliverable P' including the roll sheet to which image forming processing has been applied needs to be delivered in a state where it has been divided into a plurality of rolls, indicates the position of insertion of a divider information page that is inserted in a job in advance. That is to say, by inserting divider information in a job in advance, a divider information page can be reflected in the printed deliverable. In the present embodiment, divider information is generated by the user discretionally setting any of the conditions concerning the number of sheets to be printed, the number of copies to be printed, the print length, the print weight, and the print diameter. The divider information page will be described later.

Next, a description is given of the operations for a case where the image forming apparatus 20 performs image forming processing with respect to the roll sheet P.

First, the user generates job data, configures print settings for a job, and sets the number of rolls to be delivered on an external apparatus, such as a PC. Note that the "number of rolls" in the present embodiment denotes the count of rolls to be delivered. The job data and a job ticket, which includes information on the print settings for the job and the setting of the number of rolls to be delivered, are transmitted to the image forming apparatus 20 via the communication network. The control unit 24 of the image forming apparatus 20 accepts the job data and the job ticket that have been transmitted from the external apparatus via the communication unit 23.

FIG. 3 is a diagram showing one example of a print setting screen for a job list displayed on the display unit 26a by the control unit 24. As shown in FIG. 3, a display item 301 is a display list for displaying a list of input jobs. On the display item 301, for example, job information of the input jobs is displayed as a list in the order of input.

Job information includes, for example, the name of a document, the number of pages, the number of copies, a sheet type, and the number of rolls to be delivered. Also, the user can select a job displayed in the list of the display item 301 by operating the operation keys of the operation unit 26b. FIG. 3 depicts a state where Document1 has been selected.

The number of rolls to be delivered (hereinafter, simply the number of rolls) is the quantity of rolls to be delivered that is requested by a user of a delivery destination. In some cases, the number of rolls is determined based on specification information related to the configuration of a post-processing device owned by the user of the delivery destination. In the present embodiment, divider information is generated based on one of the conditions concerning the number of sheets to be printed, the number of copies to be printed, the print length, the print weight, and the print diameter that have been set by the user, and on the number of rolls. Furthermore, although the present embodiment is described assuming that the number of rolls has already been determined based on the specification information related to the configuration of the post-processing device, the number of rolls may be calculated from the specification information related to the configuration of the post-processing device. Such a configuration will be described in connection with other embodiments.

A display item 302 is a button that can accept an instruction for deleting, from the storage unit 25, information of a job stored in the storage unit 25 that corresponds to a job selected by the display item 301. A display item 303 is a button that can accept an instruction for setting divider information with respect to the job selected by the display item 301. Once the display item 303 has been pressed, a divider information setting screen is displayed. A display item 304 is a button that can accept an instruction for starting image formation with respect to the job selected by the display item 301.

FIG. 4A to FIG. 4C and FIG. 5A to FIG. 5E are diagrams showing examples of the divider information setting screen that is displayed on the display unit 26a by the control unit 24 in a case where the display item 303 of FIG. 3 has been pressed.

FIG. 4A shows an example of the divider information setting screen in a state where a divider information setting function is OFF. FIG. 4A shows default display information of the divider information setting screen. As shown in FIG. 4A, a display item 401 displays job information of the selected job (Document1). The display item 402 is a controller for issuing an instruction as to whether the divider information setting function (hereinafter referred to as a "divider function") is to be implemented with respect to the selected job; as shown in FIG. 4A, the divider function is in the OFF state.

A display item 403 is a controller for setting a condition of divider information (hereinafter referred to as a "divider condition"). The setting of the divider condition of the display item 403 can be changed in a case where the display item 402 is ON. As shown in FIG. 4A, as the divider condition is in the OFF state, it is assumed that there is no divider information. A display item 404 is a controller for setting the length of a divider information page (hereinafter referred to as a "divider length"). As shown in FIG. 4A, the divider length is set at 1.0 m.

A display item 405 is a print preview screen showing an image of a print result in which the divider information page set by the user has been added to the job. As the display item 402 is in the OFF state, it is assumed that the deliverable including the roll sheet is composed of one roll. Therefore, an image of one roll is displayed in the display item 405. Also, as a divider length of 1.0 m has been designated, a print preview image in which a divider information page of 1.0 m has been added as a blank sheet to the front and the rear of the roll is displayed as indicated by the display item 405. A border of the added divider information page is indicated by a dash line, which can be referred to as a benchmark for cutting in a dividing task. Note that as the divider information page, the dash line of the display item 405 may be printed as a border. Furthermore, the divider information page may be output as a plain sheet as a printed deliverable.

A display item 406 is used to change a page displayed in the print preview. A display item 407 is a button that can accept an instruction for storing the divider information and the divider information page set by the user into the storage unit 25. Once the display item 407 has been pressed, the divider information and the divider information page set by the user are stored into the storage unit 25. A display item 408 is a button for cancelling the divider information and the divider information page set by the user. Once the display item 408 has been pressed, the divider information and the divider information page set by the user are cleared.

FIG. 4B shows an example of the divider information setting screen for a case where the display item 402 has been set to the ON state. In a case where the divider function is ON, OFF is displayed as a default setting of the divider condition of the display item 403. In a case where the setting of the divider condition is OFF, divider information is automatically generated based on print setting information of the job without a user operation.

A display item 409 is a controller for divider information that has been generated in accordance with the divider condition for the job. In a case where the setting of the divider condition is OFF, the text boxes of the display item 409 are displayed in such a manner that the user cannot make changes thereto.

For example, as shown in FIG. 4B, in a case where the number of copies is "1", the control unit 24 divides the number of pages in the job by the number of rolls, and uses the value obtained by rounding up the value of the product of the division as the average number per roll. Based on the calculated average number, the control unit 24 calculates the first page and the last page for each roll, and displays the divider information in the display item 409. For example, as indicated by the display item 409, the first roll is composed of page 1 to page 250, and the second roll is composed of page 251 to page 500.

Also, in a case where OFF is set as the setting of the divider condition, the user can set the divider length. For example, as shown in FIG. 4B, in a case where a divider length of 1.0 m has been set, a print preview image is displayed in which a divider information page of 1.0 m is added to the front and the rear of each roll based on the generated divider information, as indicated by the display item 405. Furthermore, in a case where a divider length of 0 m has been set, no divider information page is generated.

In a divider information page that has been added, divider information of each roll is added. As indicated by the display item 405, the page numbers of the first page and the last page, as well as roll number information, of each roll are added to a divider information page as the divider information.

In FIG. 4A and FIG. 4B, as the number of copies is one, the divider information is generated based on the number of sheets to be printed. On the other hand, as shown in FIG. 4C, in a case where the number of copies is one or more, the divider information is generated based on the number of copies to be printed. In this case, the control unit 24 divides the number of copies in the job by the number of rolls, and uses the value obtained by rounding up the value of the product of the division as an average number of copies per roll. Based on the calculated average number of copies, the control unit 24 calculates the numbers of the first copy and the last copy for each roll, and displays the divider information in the display item 409. For example, as indicated by the display item 409 of FIG. 4C, the first roll is composed of the copy number 1 to the copy number 167, the second roll is composed of the copy number 168 to the copy number 335, and the third roll is composed of the copy number 336 to the copy number 500.

In a divider information page that has been added, divider information of each roll is added. As indicated by the display item 405, the numbers of the first copy and the last copy, the page numbers of the first page and the last page, and roll number information of each roll are added to a divider information page as the divider information.

Figure 5A:
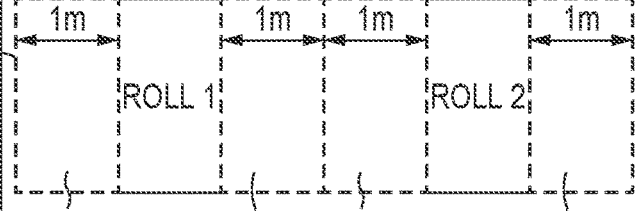

FIG. 5A shows an example of the divider information setting screen for a case where "the number of sheets to be printed" has been set as the divider condition in the display item 403 in a state where the divider function is ON. For example, as shown in FIG. 5A, the text boxes of the display item 409 allow the user to designate the first page and the last page for each roll. For example, as indicated by the display item 409, the designation has been made such that the first roll is composed of page 1 to page 250, and the second roll is composed of page 251 to page 500.

In a divider information page that has been added, divider information of each roll is added. As indicated by the display item 405, the page numbers of the first page and the last page, as well as roll number information, of each roll are added to a divider information page as the divider information.

As described above, according to the present embodiment, the user can set the divider information based on the number of sheets to be printed.

Figure 5B:
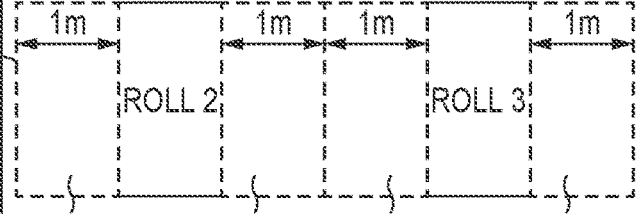

FIG. 5B shows an example of the divider information setting screen for a case where "the number of copies to be printed" has been set as the divider condition in the display item 403 in a state where the divider function is ON. For example, as shown in FIG. 5B, the text boxes of the display item 409 allow the user to designate the numbers of the first copy and the last copy for each roll. For example, as indicated by the display item 409, the first roll is composed of the copy number 1 to the copy number 150, the second roll is composed of the copy number 151 to the copy number 300, and the third roll is composed of the copy number 301 to the copy number 500.

In a divider information page that has been added, divider information of each roll is added. As indicated by the display item 405, the numbers of the first copy and the last copy, the page numbers of the first page and the last page, and roll number information of each roll are added to a divider information page as the divider information.

As described above, according to the present embodiment, the user can set the divider information based on the number of copies to be printed.

FIG. 5C shows an example of the divider information setting screen for a case where "the print length" has been set as the divider condition in the display item 403 in a state where the divider function is ON. For example, as shown in FIG. 5C, the text boxes of the display item 409 allow the user to designate the first page and the last page for each roll. The print length of each roll is derived by obtaining a cumulative total of the lengths of respective pages with respect to the first page and the last page that have been designated for each roll.

For example, as indicated by the display item 409, in a case where the page length is 297.0 mm, the first roll is composed of page 1 to page 300 and has a print length of 89100 mm, and the second roll is composed of page 301 to page 600 and has a print length of 89100 mm. Also, the third roll is composed of page 601 to page 1000 and has a print length of 118800 mm.

In a divider information page that has been added, divider information of each roll is added. As indicated by the display item 405, the page numbers of the first page and the last page, print length information for the roll number, and roll number information of each roll are added to a divider information page as the divider information.

As described above, according to the present embodiment, the user can set the divider information based on the print length by designating the page numbers.

FIG. 5D shows an example of the divider information setting screen for a case where "the print weight" has been set as the divider condition in the display item 403 in a state where the divider function is ON. For example, as shown in FIG. 5D, the text boxes of the display item 409 allow the user to designate the first page and the last page for each roll. The weight of each page can be calculated by multiplying a page area and a page basis weight, and the print weight of each roll is derived by obtaining a cumulative total of the weights of respective pages with respect to the first page and the last page that have been designated for each roll.

For example, as indicated by the display item 409, with regard to a sheet having a page basis weight of 90 g/m$^2$ and a page width and a page length of 210.0 mm and 297.0 mm, respectively, the first roll is composed of page 1 to page 2500 and has a print weight of 26.7 kg. Also, the second roll is composed of page 2501 to page 5000 and has a print weight of 25.7 kg.

In a divider information page that has been added, divider information of each roll is added. As indicated by the display item 405, the page numbers of the first page and the last page, print weight information for the roll number, and roll number information of each roll are added to a divider information page as the divider information.

As described above, according to the present embodiment, the user can set the divider information based on the print weight by designating the page numbers.

Figure 5E:
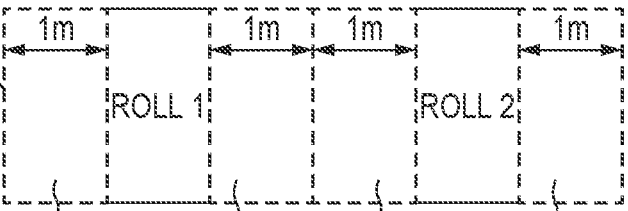

FIG. 5E shows an example of the divider information setting screen for a case where "the print diameter" (roll sheet diameter) has been selected as the divider condition in the display item 403 in a state where the divider function is ON. For example, as shown in FIG. 5E, the text boxes of the display item 409 allow the user to designate the first page and the last page for each roll. The print diameter of each roll is derived with respect to the first page and the last page that have been designated for each roll. Information necessary for the calculation of the print diameter is included in the job ticket.

As described above, according to the present embodiment, the user can set the divider information based on the print diameter by designating the page numbers.

Figure 6:
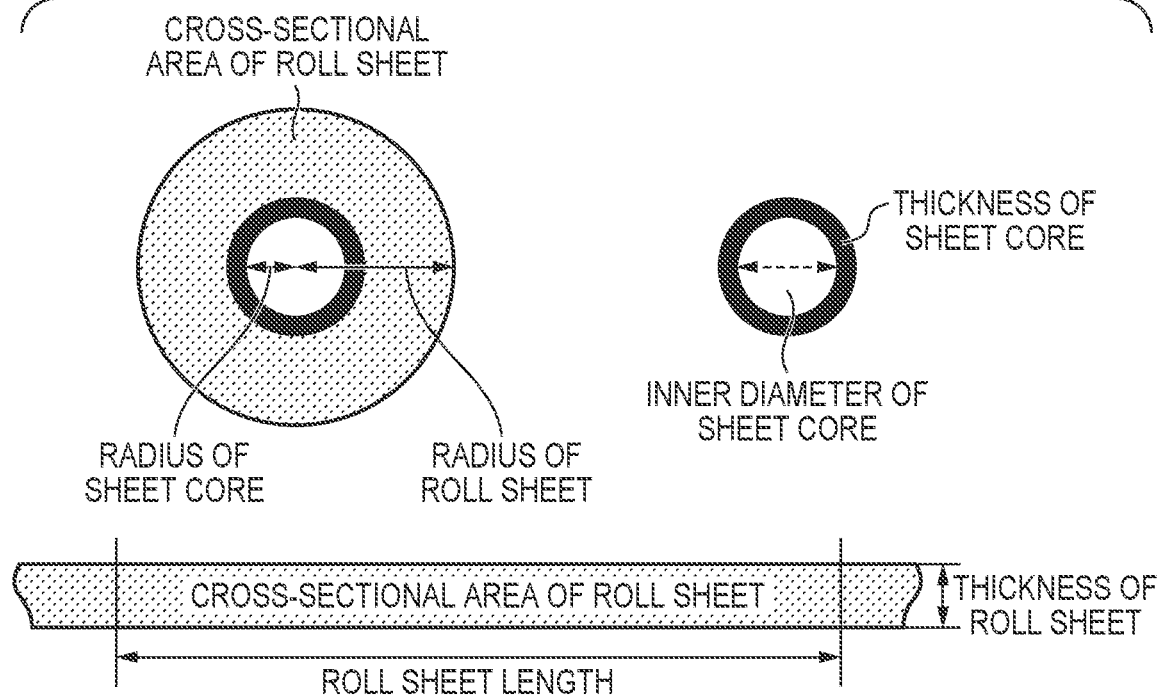
FIG. 6 is a diagram for describing a method of calculating the roll sheet diameter from the roll sheet length.

FIG. 6 is a diagram for describing a method of calculating the roll sheet diameter from the roll sheet length. In the present embodiment, the roll sheet diameter is calculated based on the following equations.

Radius of sheet core=(inner diameter of sheet core+
thickness of sheet core×2)÷2

Cross-sectional area of sheet core=radius of sheet
core×radius of sheet core×π

Roll sheet length=cumulative total of lengths of
respective pages in roll Cross-sectional area of
roll sheet=roll sheet length×roll sheet thickness+cross-sectional area of sheet core Roll sheet diameter=roll sheet radius×2

Hereinafter, π is expressed as 3.14.

For example, in a case where the inner diameter of the sheet core is 76 mm, the thickness of the sheet core is 5 mm, the roll sheet thickness is 80 μm, the page length is 297.0 mm, and the number of pages is 2500, the following calculations are performed.

Radius of sheet core=(76+5×2)÷2=43 [mm]

Cross-sectional area of sheet core=43×43×3.14=5806
[mm$^2$]

Roll sheet length=297.0×2500=742500 [mm]

Cross-sectional area of roll sheet=742500×0.08+
5806=65206 [mm$^2$]

Roll sheet radius=√(65206÷3.14)=144.1 [mm]

Roll sheet diameter=144.1×2=288.2 [mm]

For example, as indicated by the display item 409 of FIG. 5E, in a case where the inner diameter of the sheet core is 76 mm, the thickness of the sheet core is 5 mm, the roll sheet thickness is 80 μm, and the page length is 297.0 mm, the first roll is composed of page 1 to page 2500 and has a print diameter of 288.2 mm. Also, the second roll is composed of page 2501 to page 5000 and has a print diameter of 288.2 mm.

In a divider information page that has been added, divider information of each roll is added. As indicated by the display item 405, the page numbers of the first page and the last page, print diameter information for the roll number, and roll number information of each roll are added to a divider information page as the divider information.

As described above, according to the present embodiment, the user can set the divider information based on the print diameter by designating the page numbers.

Figure 7:
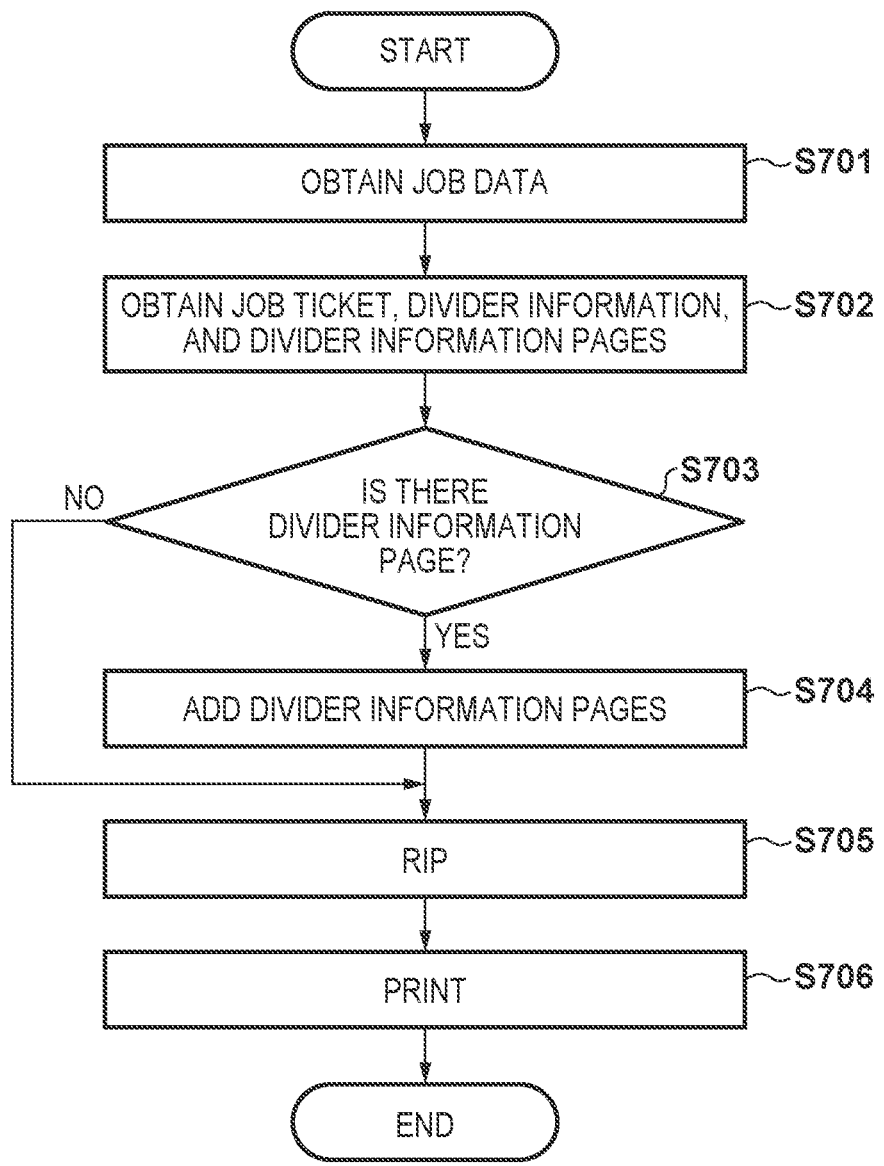
FIG. 7 is a flowchart showing processing for performing printing on a roll sheet.

FIG. 7 is a flowchart showing processing for performing printing on the roll sheet P. Functions corresponding to processing of FIG. 7 are realized by the CPU of the control unit 24 executing the system program stored in the storage unit 35. Processing of FIG. 7 is started in a case where, for example, a job has been selected by the display item 301 and the display item 304 has been pressed.

In step S701, the control unit 24 obtains job data selected by the display item 301. In step S702, the control unit 24 obtains a job ticket of the job selected by the display item 301, and divider information pages set by the user.

In step S703, the control unit 24 determines whether there are divider information pages. In a case where it has been determined that there is no divider information page in step S703, processing proceeds to step S705. It is determined that there is no divider information page, for example, in a case where a divider length of 0 m has been set in the display item 404, and in a case where a divider length has not been set.

In step S704, based on divider information set by the user, the control unit 24 divides the job into a plurality of rolls at the first page (or the first copy) and the last page (or the last copy) of each roll, which are included in the divider information, and adds a divider information page to the front and the rear of each roll.

In step S705, the control unit 24 generates image data to be printed by executing RIP (Raster Image Processing) processing with respect to the job. Regarding the job mentioned here, the divider information pages have not been added thereto in a case where it was determined that there is no divider information page in step S703, and the divider information pages have been added thereto in a case where it was determined that there are divider information pages in step S703. In step S706, the control unit 24 forms images on the roll sheet P based on the image data with use of the image forming unit 22, and then ends processing of FIG. 7.

As described above, according to the present embodiment, divider information can be set based on print information, such as the number of copies to be printed and the page numbers, and the number of rolls that have been designated by the user. Furthermore, the user can refer to the print length, the print weight, and the print diameter (roll sheet diameter) by designating the page numbers.

Second Embodiment

Below, a second embodiment will be described in connection with the differences from the first embodiment. In the present embodiment, as shown in FIG. 8, a plurality of divider lengths can be set using a display item 801 and a display item 802.

Figure 8:
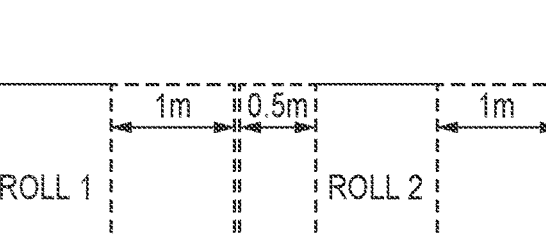
FIG. 8 is a diagram showing a divider information setting screen.

FIG. 8 is a diagram showing an example of the divider information setting screen according to the present embodiment. In the present embodiment, the lengths of divider information pages that have been added to the front and the rear of a roll can each be set. As shown in FIG. 8, the display item 801 is a controller for setting the divider length in a portion anterior to a roll; for example, a divider length of 0.5 m is set therein.

The display item 802 is a controller for setting the divider length in a portion posterior to a roll; for example, a divider length of 1.0 m is set therein. Note that the divider length in the anterior portion is the divider length anterior to a roll in the conveyance direction of the roll sheet P, whereas the divider length in the posterior portion is the divider length posterior to the roll in the conveyance direction of the roll sheet P. Consequently, as indicated by a display item 803, a print preview image is displayed in which a divider information page having a length of 0.5 m is added to a portion anterior to a roll, and a divider information page having a length of 1.0 m is added to a portion posterior to the roll.

As described above, according to the present embodiment, the user can set the length of each of the divider information pages that have been added to the front and the rear of a roll, and wasteful regions can be reduced by setting different lengths as necessary.

Third Embodiment

Below, a third embodiment will be described in connection with the differences from the first and second embodiments. In the present embodiment, a comment field in which the user can freely write divider information is configured in a divider information setting screen.

Figure 9:
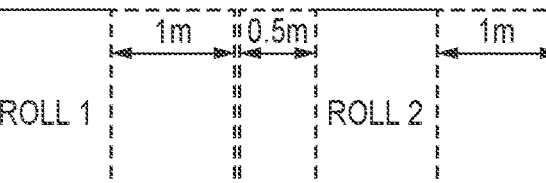
FIG. 9 is a diagram showing a divider information setting screen.

FIG. 9 is a diagram showing an example of the divider information setting screen according to the present embodiment. As shown in FIG. 9, a display item 901 is a controller that allows the user to write divider information, and the writing can be performed by operating the operation keys of the operation unit 26b. Hereinafter, information written by the user is referred to as "user-written information".

For example, as indicated by the display item 901, "Delivery: Company A" and the like can be written as the user-written information. Consequently, as indicated by a display item 902, the page numbers of the first page and the last page and roll number information for the roll number, as well as the user-written information, are added to a divider information page as the divider information.

As described above, according to the present embodiment, the user can write divider information as necessary, thereby providing a reminder for a dividing task and information on post-processes.

Fourth Embodiment

A fourth embodiment is now described in connection with the differences from the first to the third embodiments. With regard to image formation on a roll sheet, there are cases where image formation is performed in accordance with a layout in which one job is separated into a plurality of lanes. In these cases, there is a task to divide a deliverable including a roll sheet into a plurality of rolls before delivery by performing slitter processing with respect to the lanes of the roll sheet included in the deliverable.

Figure 10A:
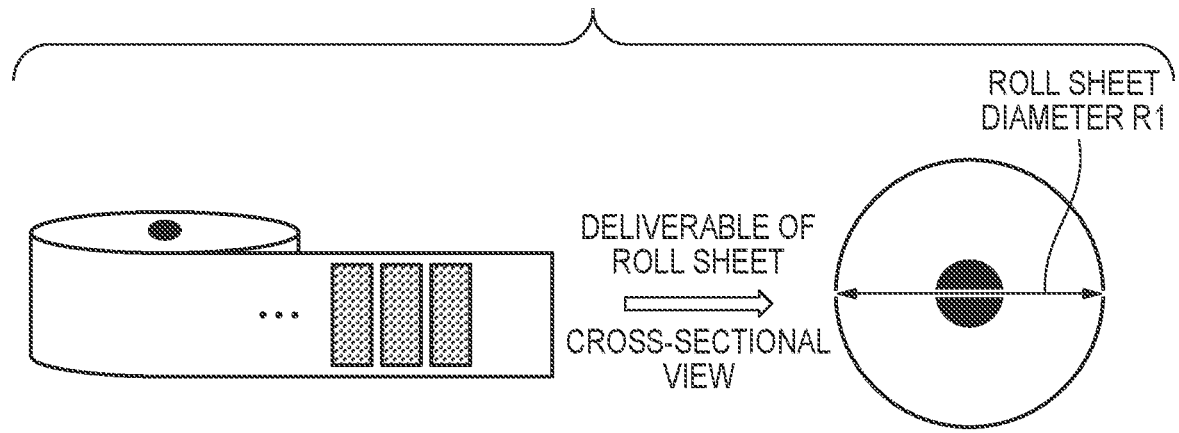
FIG. 10A and FIG. 10B are diagrams for describing a dividing task.
Figure 10B:
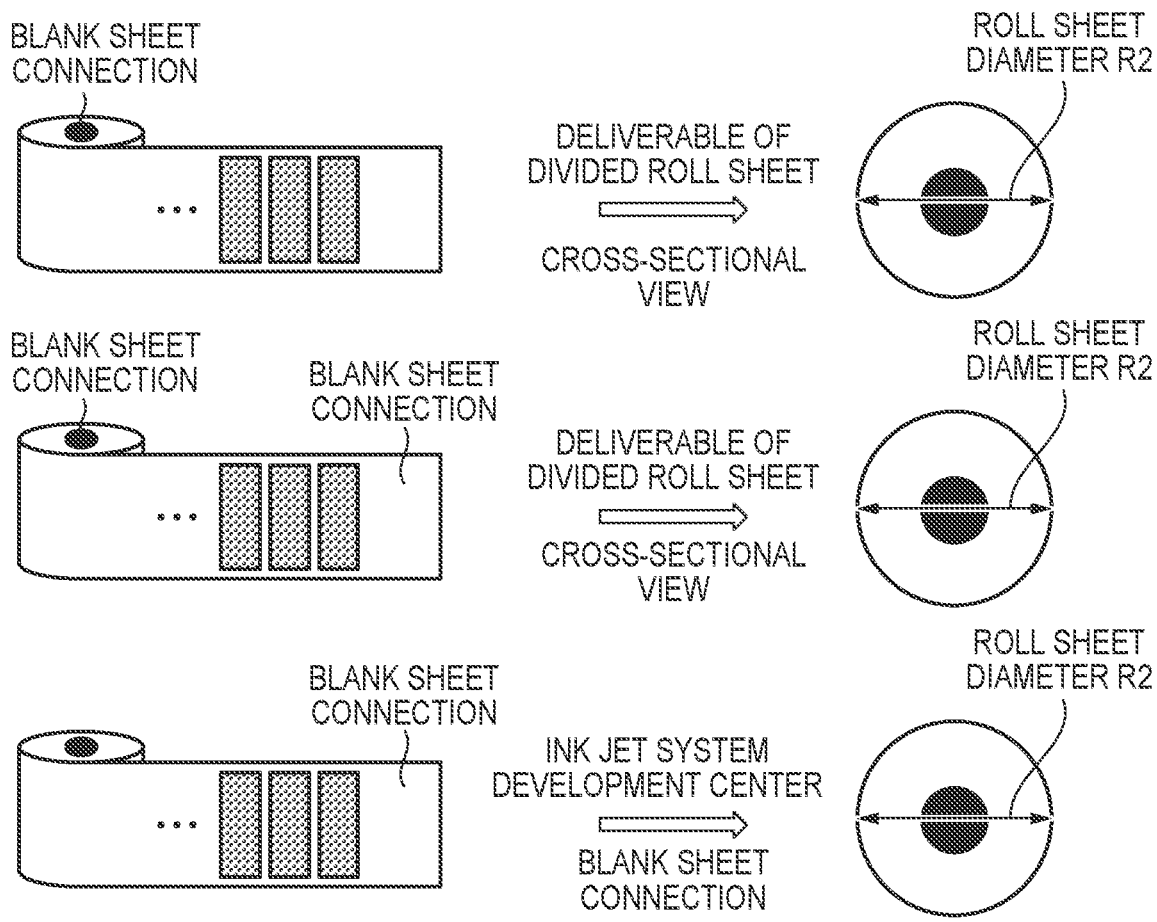
Figure 11A:
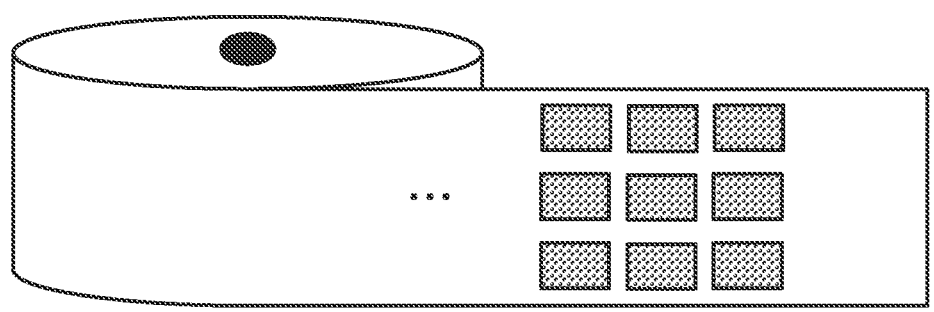
FIG. 11A and FIG. 11B are diagrams for describing a dividing task.
Figure 11B:
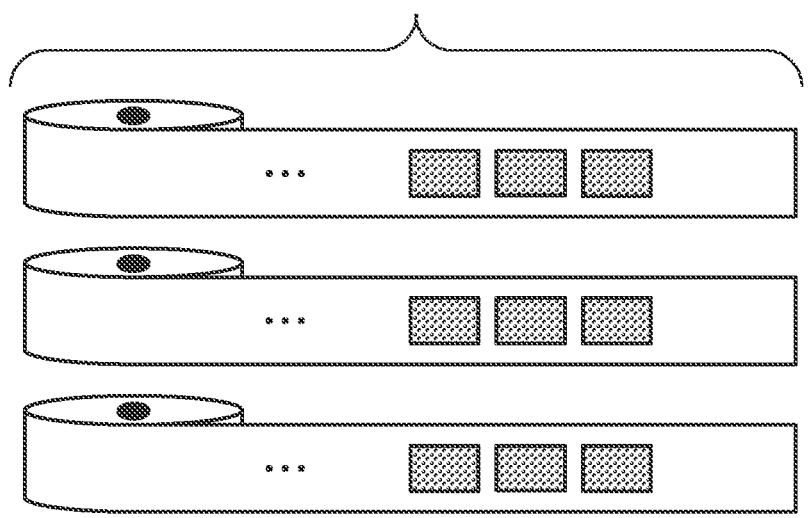

FIG. 11A is a diagram showing an example in which image formation is performed on a deliverable including a roll sheet in accordance with a layout in which print data is separated into three lanes. Before delivery, an operator needs to divide a deliverable including a roll sheet into a plurality of rolls in accordance with a request about the external size of the rolls to be delivered and the number of rolls to be delivered that has been provided by a user of a delivery destination of the deliverable including the roll sheet. For example, as shown in FIG. 11B, a task to divide the deliverable including the roll sheet into three rolls by performing slitter processing with respect to each lane is performed. Here, in a case where the diameter of the roll sheet and the weight of the roll sheet in each roll exceed the restrictions related to the specifications of a post-processing device, the above-described task of FIG. 10A and FIG. 10B is expected to further arise. For this reason, before delivery, it is necessary to prepare a layout while taking into consideration the request about the external size of the rolls to be delivered and the number of rolls to be delivered that has been provided by the user of the delivery destination. Furthermore, it is desired to derive the number of rolls to be delivered from the restrictions related to the specifications of the post-processing device (e.g., the maximum roll diameter, the maximum weight, and the maximum length) based on the external size of rolls that meet every restriction related to the specifications.

The present embodiment will be described in connection with the operations of the image forming apparatus 20 that can generate divider information in consideration of the restrictions related to the specifications of a post-processing device in a case where a layout is generated for one job that has been separated into a plurality of lanes.

First, with use of an external apparatus, such as a PC, a user transmits data of an object, as well as a job ticket including a print request, the number of rolls to be delivered, and information on the restrictions related to the specifications of a post-processing device, to the image forming apparatus 20 via the communication network. The control unit 24 of the image forming apparatus 20 accepts the data of the object and the job ticket that have been transmitted from the external apparatus via the communication unit 23.

Figure 12:
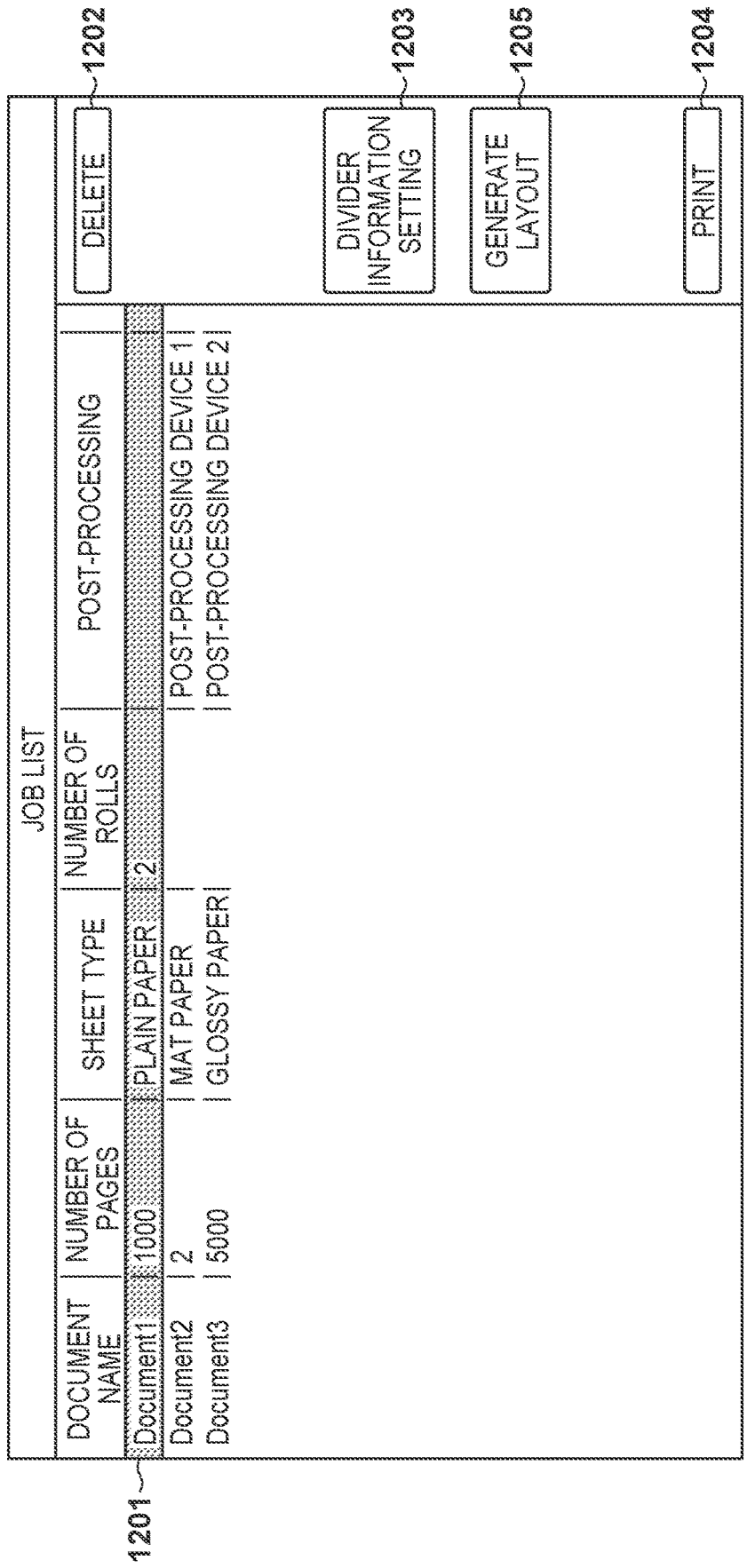
FIG. 12 is a diagram showing a print setting screen for a job list.

FIG. 12 is a diagram showing one example of a print setting screen for a job list displayed on the display unit 26a by the control unit 24. The description that has been provided for the display items 301, 302, and 304 of FIG. 3 applies to display items 1201, 1202, and 1204 of FIG. 12.

A display item 1205 is a button that can accept an instruction for generating a layout. Once the display item 1205 has been pressed, a layout setting screen for a job selected by the display item 1201 is displayed. Note that the description that has been provided for a case where the display item 303 of FIG. 3 has been pressed applies to the operations for a case where the display item 1203 has been pressed.

Figure 13A:
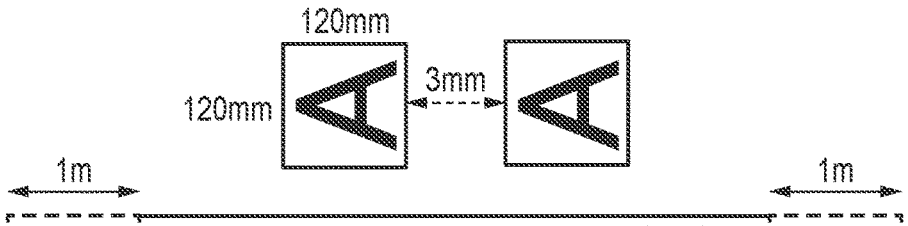
FIG. 13A is a diagram showing a layout setting screen.
Figure 13B:
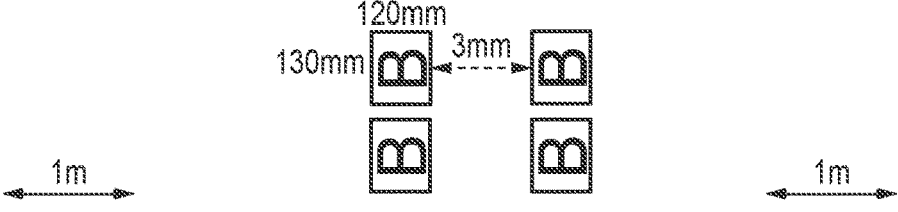
FIG. 13B is a diagram showing a layout setting screen.

FIG. 13A, FIG. 13B, FIG. 13C, FIG. 14A, FIG. 14B, FIG. 14C, and FIG. 14D are diagrams showing examples of the layout setting screen that is displayed on the display unit 26a by the control unit 24 in a case where the display item 1205 of FIG. 12 has been pressed. As shown in FIG. 13A to FIG. 13C, a print setting screen is displayed as a result of the user selecting a tab of a display item 1301, and a specification setting screen for a post-processing device is displayed as a result of the user selecting a tab of a display item 1302. In a default state, the print setting screen is displayed.

The print setting screen is a screen for accepting settings related to a layout of the object. The print setting screen allows, for example, inputting and changing of settings related to a sheet type, a sheet width, the number of pages of an object to be formed as images, an inter-object interval, the number of lanes, an object output method, divider information, and so forth, as well as displaying of a print preview image for the job in accordance with the settings.

The specification setting screen for the post-processing device is a screen that displays the specifications of the post-processing device that has been registered. The specification setting screen for the post-processing device allows, for example, inputting and changing of the maximum roll diameter, the maximum roll length, the maximum roll weight, the inner diameter of the sheet core, the thickness of the sheet core, etc. that can be set in the post-processing device. Furthermore, a specification setting screen for the post-processing device can be added or deleted as necessary.

A display item 1303 is a controller for setting the number of rolls; for example, in FIG. 13A, one roll is set thereas. A display item 1304 is a print preview screen showing an image of a print result in which a divider information page has been added to the front and the rear of the job in accordance with the print settings and the settings of the specifications of the post-processing device. A border of the added divider information page is indicated by a dash line, which is used as a benchmark for cutting in a dividing task.

A display item 1305 is a button for storing data that has been generated in accordance with layout information set by the user into the storage unit 25. Pressing the display item 1305 causes data of the job to be stored into the storage unit 25.

The control unit 24 calculates, for example, the first page and the last page for each roll based on the total print length, the print length of each roll, the number of lanes, and the number of rolls, and generates divider information page for each roll in accordance with the divider length. In a case where a divider length of 0 m has been designated, no divider information page is generated. Also, for example, the page numbers of the first page and the last page, the print length, and number information of each roll are added to the divider information page as divider information.

The print length of each roll is calculated based on the following equation.

Total print length=the length of data of the object in
the conveyance direction×the total number of
pages+the object interval×the total number of
pages <Case 1> In a case where the number of rolls is the same as the number of lanes, the print length of each roll is calculated based on the following equation.

The print length of each roll=the total print length÷
the number of lanes

<Case 2> In a case where the number of rolls is different from the number of lanes, the print length of each roll and the number of pages in each roll are calculated based on the following equations.

The print length of each roll=the total print
length÷the number of lanes÷(the number of
rolls÷the number of lanes)

The number of pages in each roll=the print length of
each roll÷(the length of data of the object in the
conveyance direction+the object interval)

FIG. 13A shows one example of the layout setting screen for a case where a deliverable includes one roll and the number of lanes is one. As shown in FIG. 13A, the object is laid out based on the following settings: the width and the length of the object are respectively 120.0 mm and 120.0 mm, the object interval is 3 mm, the number of lanes is one, and the output method is head first.

The total print length, the print length of each roll, and the number of pages in each roll are calculated as follows.

The total print length=120.0×1000+3×1000=123000
[mm]

The print length of each roll=123000÷1=123000
[mm] (falls under Case 1 because the number
of rolls and the number of lanes are both one)

The number of pages in each roll=123000÷(120.0+3)
=1000

As shown in FIG. 13A, as the number of rolls is one, it is assumed that the deliverable including the roll sheet is composed of one roll, and an image of one roll is displayed as the display item 1304. The first roll is composed of page 1 to page 1000, and has a print length of 123000 mm; once a divider information page has been generated, the display item 1304 displays an image in which the divider information page has been added to the front and the rear of the first roll.

FIG. 13B shows one example of the layout setting screen for a case where a deliverable includes two rolls and the number of lanes is two. As shown in FIG. 13B, the object is laid out based on the following settings: the width and the length of the object are respectively 130.0 mm and 120.0 mm, the object interval is 3 mm, the number of lanes is two, and the output method is head first.

The total print length, the print length of each roll, and the number of pages in each roll are calculated as follows.

The total print length=120.0×2000+3×2000=246000
[mm]

The print length of each roll=246000÷2=123000
[mm] (falls under Case 1 because the number
of rolls and the number of lanes are both two)

The number of pages in each roll=123000÷(120.0+3)
=1000

As shown in FIG. 13B, as the number of rolls is two, it is assumed that the deliverable including the roll sheet is composed of two rolls, and an image of two rolls is displayed as the display item 1304. The first roll is composed of page 1 to page 1000, and has a print length of 123000 mm; a divider information page is generated and added to the front and the rear of the first roll. The second roll is composed of page 1001 to page 2000, and has a print length of 123000 mm; a divider information page is generated and added to the front and the rear of the second roll. An image thereof is displayed as the display item 1304.

FIG. 13C shows one example of the layout setting screen for a case where a deliverable includes four rolls and the number of lanes is two. As shown in FIG. 13C, the object is laid out based on the following settings: the width and the length of the object are respectively 130.0 mm and 120.0 mm, the object interval is 3 mm, the number of lanes is two, and the output method is head first.

The total print length, the print length of each roll, and the number of pages in each roll are calculated as follows.

The total print length=120.0×4000+3×4000=492000
[mm]

The print length of each roll=492000÷2÷(4÷2)
=123000 [mm] (falls under Case 2 because the
number of rolls is four and the number of lanes
is two)

The number of pages in each roll=123000÷(120.0+3)
=1000

As shown in FIG. 13C, as the number of rolls is four, it is assumed that the deliverable including the roll sheet is composed of four rolls, and an image of four rolls is displayed as the display item 1304. The first roll is composed of page 1 to page 1000, and has a print length of 123000 mm; a divider information page is generated and added to the front and the rear of the first roll. The second roll is composed of page 1001 to page 2000, and has a print length of 123000 mm; a divider information page is generated and added to the front and the rear of the second roll. The third roll is composed of page 2001 to page 3000, and has a print length of 123000 mm; a divider information page is generated and added to the front and the rear of the third roll. The fourth roll is composed of page 3001 to page 4000, and has a print length of 123000 mm; a divider information page is generated and added to the front and the rear of the fourth roll. An image thereof is displayed as the display item 1304.

As shown in FIG. 14A to FIG. 14D, a display item 1306 is a controller for calculating the optimal number of rolls based on the specifications of the post-processing device that has been registered on the specification setting screen for the post-processing device. Once the selection of the display item 1306 has been accepted, the specification setting screen for the post-processing device is displayed. In a case where no post-processing device has been registered on the specification setting screen for the post-processing device, the optimal number of rolls is assumed to be one.

Figure 14A:
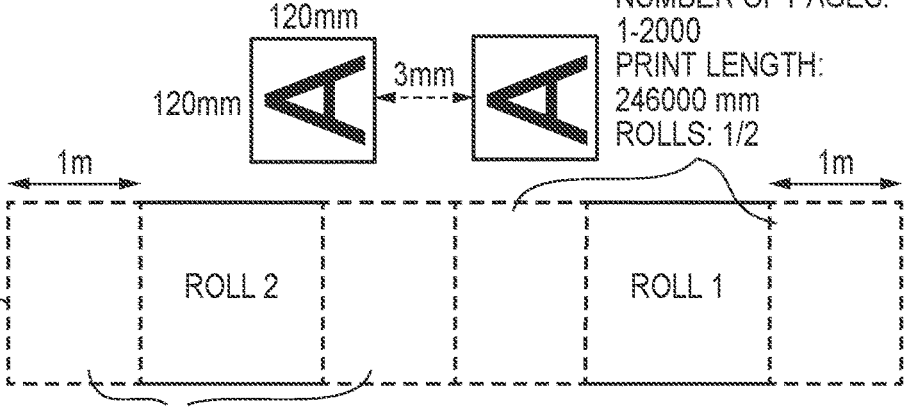
FIG. 14A is a diagram showing a layout setting screen.

FIG. 14A shows one example of the layout setting screen displayed in a case where the display item 1306 has been selected in a state where a post-processing device 1 has been registered on the specification setting screen for the post-processing device indicated by the display item 1302. As shown in FIG. 14A, with regard to the post-processing device 1, the maximum roll diameter is 280 mm, the maximum roll length is 300 m, the maximum roll weight is 7 kg, the inner diameter of the sheet core is 76 mm, and the thickness of the sheet core is 5 mm. An example of processing for calculating the optimal number of rolls in accordance with the specifications of the post-processing device 1, which is executed when the display item 1306 has been selected, will be described later using FIG. 15. When the display item 1306 has been selected, the optimal number of rolls corresponding to the specifications of the post-processing device 1 is calculated, and the calculated optimal number of rolls is displayed in a display item 1307. As shown in FIG. 14A, the optimal number of rolls is two. The object is laid out based on the following settings: the width and the length of the object are respectively 120.0 mm and 120.0 mm, the object interval is 3 mm, the number of lanes is one, and the output method is head first.

The total print length, the print length of each roll, and the number of pages in each roll are calculated as follows.

The total print length=120.0×4000+3×4000=492000 [mm]

The print length of each roll=492000÷1÷(2÷1)
=246000 [mm] (falls under Case 2 because the number of rolls is two and the number of lanes is one)

The number of pages in each roll=246000÷(120.0+3)
=2000

As shown in FIG. 14A, as the number of rolls is two, it is assumed that the deliverable including the roll sheet is composed of two rolls, and an image of two rolls is displayed as the display item 1304. The first roll is composed of page 1 to page 2000, and has a print length of 246000 mm; a divider information page is generated and added to the front and the rear of the first roll. The second roll is composed of page 2001 to page 4000, and has a print length of 246000 mm; a divider information page is generated and added to the front and the rear of the second roll. An image thereof is displayed as the display item 1304.

Figure 14B:
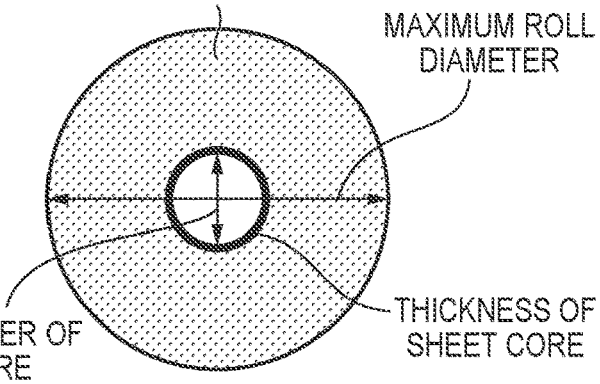
FIG. 14B is a diagram showing a layout setting screen.

FIG. 14B shows one example of the layout setting screen displayed in a case where the display item 1306 has been selected in a state where a post-processing device 1 and a post-processing device 2 have been registered on the specification setting screen for the post-processing device indicated by the display item 1302. With regard to the registered post-processing device 1, the maximum roll diameter is 280 mm, the maximum roll length is 350 m, the maximum roll weight is 7 kg, the inner diameter of the sheet core is 76 mm, and the thickness of the sheet core is 5 mm. With regard to the registered post-processing device 2, the maximum roll diameter is 200 mm, the maximum roll length is 300 m, the maximum roll weight is 3 kg, the inner diameter of the sheet core is 76 mm, and the thickness of the sheet core is 5 mm. An example of processing for calculating the optimal number of rolls in accordance with the specifications of the post-processing device 1 and the post-processing device 2, which is executed when the display item 1306 has been selected, will be described later using FIG. 15. When the display item 1306 has been selected, the optimal number of rolls corresponding to the specifications of the post-processing device 1 and the post-processing device 2 is calculated, and the calculated optimal number of rolls is displayed in the display item 1307. As shown in FIG. 14C, the optimal number of rolls is four. The object is laid out based on the following settings: the width and the length of the object are respectively 130.0 mm and 120.0 mm, the object interval is 3 mm, the number of lanes is two, and the output method is head first.

The total print length, the print length of each roll, and the number of pages in each roll are calculated as follows.

The total print length=120.0×4000+3+4000=492000 [mm]

The print length of each roll=492000÷2÷(4→2)
=123000 [mm] (falls under Case 2 because the number of rolls is four and the number of lanes is two)

The number of pages in each roll=123000÷(120.0+3)
=1000

As shown in FIG. 14C, as the number of rolls is two, it is assumed that the deliverable including the roll sheet is composed of two rolls, and an image of two rolls is displayed as the display item 1304. The first roll is composed of page 1 to page 1000, and has a print length of 123000 mm; a divider information page is generated and added to the front and the rear of the first roll. The second roll is composed of page 1001 to page 2000, and has a print length of 123000 mm; a divider information page is generated and added to the front and the rear of the second roll. The third roll is composed of page 2001 to page 3000, and has a print length of 123000 mm; a divider information page is generated and added to the front and the rear of the third roll. The fourth roll is composed of page 3001 to page 4000, and has a print length of 123000 mm; a divider information page is generated and added to the front and the rear of the fourth roll. An image thereof is displayed as the display item 1304.

Figure 15:
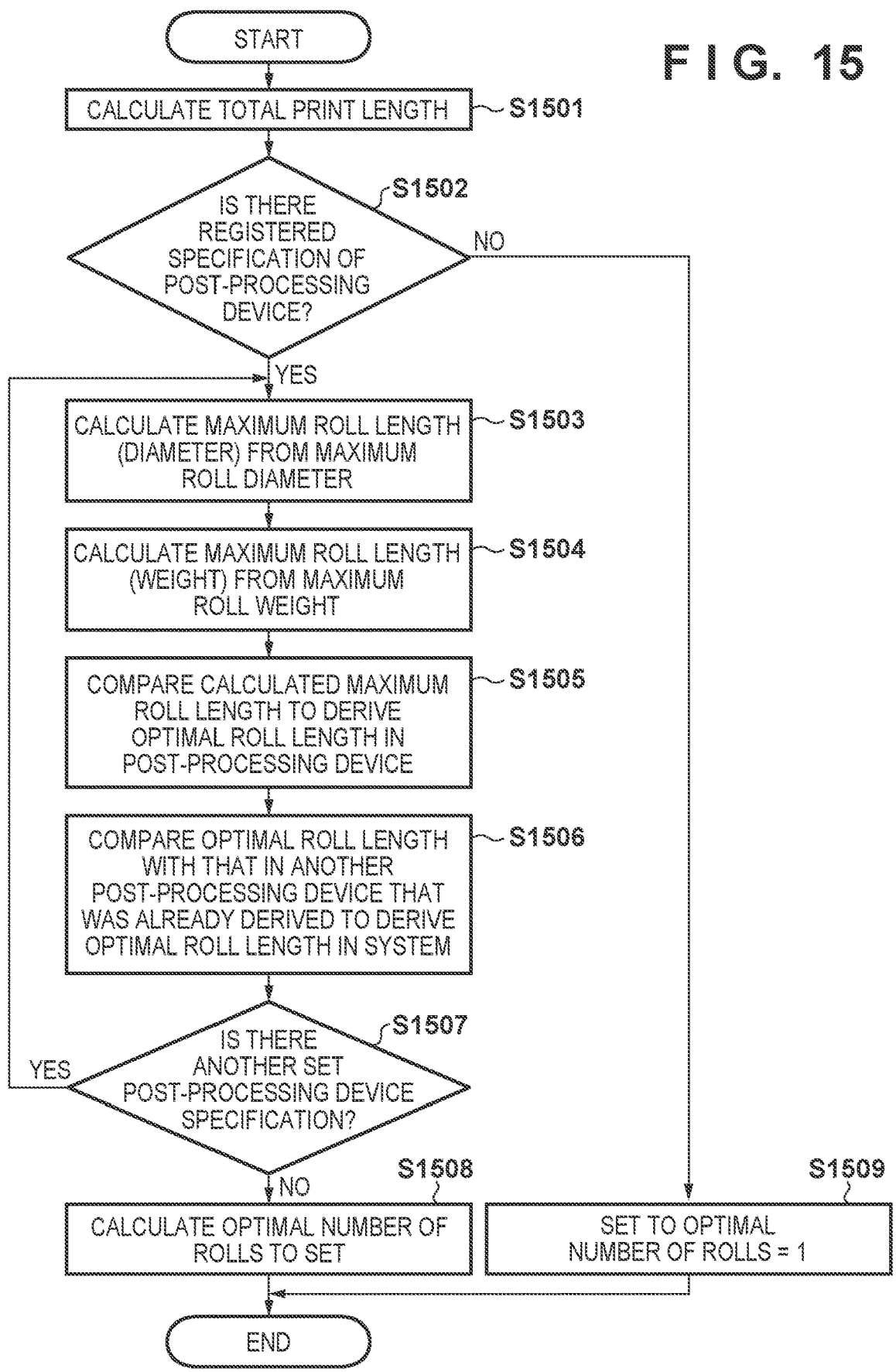
FIG. 15 is a flowchart showing processing for calculating the optimal number of rolls.

FIG. 15 is a flowchart showing processing for calculating the optimal number of rolls, which is executed by the control unit 24. Functions corresponding to processing of FIG. 15 are realized by, for example, the CPU of the control unit 24 executing the system program stored in the storage unit 35. Processing of FIG. 15 is started in a case where the display item 1306 has been selected.

In step S1501, the control unit 24 calculates the total print length based on data of an object, print settings, and so forth. In the case of FIG. 14A and FIG. 14B, the total print length is calculated as follows.

The total print length=120.0×4000+3×4000=492000 [mm]

In step S1502, based on whether there is information on settings of the specifications of a post-processing device registered via the display item 1302, the control unit 24 determines whether it is necessary to execute processing for calculating the optimal number of rolls. In a case where it is determined that there is no information on settings of the specifications of a registered post-processing device, processing proceeds to step S1509. On the other hand, in a case where it is determined that there is information on settings of the specifications of a registered post-processing device, processing proceeds to step S1503.

In step S1503, the control unit 24 calculates the maximum roll length from the maximum roll diameter based on information on settings of the specifications of a registered post-processing device 1. Hereinafter, the maximum roll length derived from the maximum roll diameter is referred to as a first maximum roll length. Based on the equations that have been mentioned in connection with FIG. 6, the first maximum roll length is calculated for a case where the inner diameter of the sheet core is 76 mm, the thickness of the sheet core is 5 mm, and the thickness of the roll sheet is 80 μm. In the case of FIG. 14A, the first maximum roll length in the post-processing device 1 is calculated as follows.

That is to say, the radius of the sheet core and the cross-sectional area of the sheet core are calculated as follows from the inner diameter of the sheet core and the thickness of the sheet core, which are respectively 76 mm and 5 mm.

Radius of sheet core=(76+5×2)÷2=43 [mm]

Cross-sectional area of sheet core=43×43×3.14=5806 [mm$^2$]

Meanwhile, as the radius of the roll sheet is 140 mm based on a maximum roll diameter of 280 mm, which is a specification of the post-processing device 1, the cross-sectional area of the roll sheet is calculated as follows.

Cross-sectional area of roll sheet=140×140× 3.14=61544 [mm$^2$]

Then, the area obtained by subtracting the cross-sectional area of the sheet core from the cross-sectional area of the roll sheet is: 61544−5806=55738 [mm$^2$]. As a result, the first maximum roll length in the post-processing device 1 is calculated as follows.

The first maximum roll length in the post-processing device 1=55738 [mm$^2$]÷80 [μm]=696727 [mm]

In step S1504, the control unit 24 calculates the maximum roll length from the maximum roll weight based on information on the settings of the specifications of the registered post-processing device 1. Hereinafter, the maximum roll length derived from the maximum roll weight is referred to as a second maximum roll length. The second maximum roll length is calculated as follows.

The second maximum roll length=the maximum roll weight÷the width of the roll sheet÷basis weight In the case of the post-processing device 1 according to FIG. 14A, as the maximum roll weight, the width of the roll sheet, and the basis weight are 7 kg, 130 mm, and 81 g/m$^2$, respectively, the second maximum roll length in the post-processing device 1 is calculated as follows.

The second maximum roll length in the post-processing device 1=664768 mm

In step S1505, the control unit 24 compares the maximum roll length in the registered post-processing device, the first maximum roll length in that post-processing device, and the second maximum roll length in that post-processing device with one another, and obtains the smallest value. At this time, in a case where any of the maximum roll length, the first maximum roll length, and the second maximum roll length is zero, it is excluded from the targets of comparison.

Furthermore, in a case where all of the maximum roll length, the first maximum roll length, and the second maximum roll length are zero, the total print length is used as the smallest value. The control unit 24 uses the smallest value that has been obtained in the foregoing manner as the optimal roll length in the currently-pertinent post-processing device. In other words, among a plurality of candidates that are obtained from the respective specifications, one that has the smallest value is used as the optimal roll length.

In the case of the post-processing device 1 according to FIG. 14A, the maximum roll length in the registered post-processing device 1 is 350000 mm, the first maximum roll length is 696727 mm, and the second maximum roll length is 664768 mm. Therefore, 350000 mm is derived as the optimal roll length in the post-processing device 1.

In step S1506, the control unit 24 compares the optimal roll length with the optimal roll length in another post-processing device that has already been derived, and uses the smallest value as the optimal roll length in the system.

In step S1507, based on whether there is information on settings of the specifications of another post-processing device registered via the display item 1302, the control unit 24 determines whether it is necessary to execute processing for calculating the optimal number of rolls. In a case where it is determined that there is no information on settings of the specifications of another registered post-processing device, processing proceeds to step S1508. On the other hand, in a case where it is determined that there is information on settings of the specifications of another registered post-processing device, processing is repeated from step S1503.

A description is now given of a case where, for example, it is determined that there is information on settings of the specifications of the post-processing device 2 according to FIG. 14B. Processing similar to steps S1503 to S1505 is executed also with respect to the post-processing device 2. As a result, the first maximum roll length and the second maximum roll length in the post-processing device 2 are calculated as follows.

As the radius of the roll sheet is 100 mm based on a maximum roll diameter of 200 mm, which is a specification of the post-processing device 2, the cross-sectional area of the roll sheet is calculated as follows.

Cross-sectional area of roll sheet=100×100× 3.14=31400 [mm$^2$]

Then, the area obtained by subtracting the cross-sectional area of the sheet core from the cross-sectional area of the roll sheet is: 31400−5806=25594 [mm$^2$]. As a result, the first maximum roll length in the post-processing device 2 is calculated as follows.

The first maximum roll length in the post-processing device 2=25594 [mm$^2$]÷80 [μm]=319927 [mm]

Furthermore, as the maximum roll weight, the width of the roll sheet, and the basis weight in the post-processing device 2 are 3 kg, 280 mm, and 81 g/m$^2$, respectively, the second maximum roll length in the post-processing device 2 is calculated as follows.

The second maximum roll length in the post-processing device 2=132276 mm

In the case of the post-processing device 2, the maximum roll length in the registered post-processing device 2 is 300000 mm, the first maximum roll length is 319927 mm, and the second maximum roll length is 132276 mm. Therefore, 132276 mm is derived as the optimal roll length in the post-processing device 2.

In a case where processing of steps S1503 to S1506 related to information on settings of the specifications of the post-processing device 2 has been performed after processing of steps S1503 to S1506 related to information on settings of the specifications of the post-processing device 1, the optimal roll length in the post-processing device 2 is compared with the optimal roll length in the post-processing device 1. Then, the smaller one is decided on as the optimal roll length. In the case of the present example, in step S1506, the optimal roll length in the post-processing device 2, namely 132276 mm, is decided on as the optimal roll length in the system.

In step S1508, the control unit 24 calculates the optimal number of rolls based on the optimal roll length that was decided on in step S1506.

For example, in a case where an optimal roll length of 132276 mm was decided on in step S1506, the control unit 24 divides the total print length by the optimal roll length, and uses the value obtained by rounding up the value of the product of the division as the optimal number of rolls, as indicated by the following equation.

The optimal number of rolls=492000÷132276=4

Note that the optimal number of rolls is calculated as follows in a case where, for example, the optimal roll length in the post-processing device 1, namely 350000 mm, was decided on as the optimal number of rolls in the system (e.g., in a case where settings of the specifications of the post-processing device 2 have not been registered).

The optimal number of rolls=492000÷350000=2

In step S1508, the control unit 24 sets the optimal number of rolls that has been calculated in the foregoing manner in the display item 1307, and then ends processing of FIG. 15.

In a case where it is determined that there is no information on settings of the specifications of a registered post-processing device in step S1502, the control unit 24 decides that the optimal number of rolls is one and sets this optimal number of rolls in the display item 1307 in step S1509, and then ends processing of FIG. 15.

As described above, according to the present embodiment, when divider information is generated in accordance with a layout, the optimal number of rolls to be delivered can be calculated in accordance with restrictions regarding the specifications of a post-processing device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012025, filed Jan. 28, 2022, which is hereby incorporated by reference herein in its entirety.

What is claimed is:

1. An image forming apparatus comprising:
at least one memory and at least one processor which cause the image forming apparatus to:
(1) in a case where rolls are divided from a roll-shaped printing medium, obtain a number of rolls based on specification information of a roll which is able to be provided in a post-processing device;
(2) perform control so as to display a screen on which can be designated information of a group of images, among a group of images designated by a job, corresponding to each of rolls in the obtained number of rolls;
(3) set a divider region in the group of images designated by the job based on the information of the group of images designated on the screen, the divider region being for dividing the roll-shaped printing medium into of the rolls in the obtained number of rolls; and
(4) perform control so as to print, on the roll-shaped printing medium, the group of images designated by the job in which the divider region has been reflected,
wherein information of a print length, a print weight, or a diameter of a roll sheet is displayed together with the information of the group of images corresponding to each of the rolls in the obtained number of rolls.

2. The image forming apparatus according to claim 1, wherein the at least one processor causes the image forming apparatus to obtain the number of rolls based on the specification information and print information of the group of images designated by the job.

3. The image forming apparatus according to claim 2, wherein the specification information includes (1) an inner diameter of a tube that serves as a core of the roll which is able to be provided in the post-processing device, (2) a thickness of the tube, (3) a maximum roll diameter, (4) a maximum roll weight, and (5) a maximum roll length.

4. The image forming apparatus according to claim 3, wherein the print information includes a print length of the group of images.

5. The image forming apparatus according to claim 4, wherein the print length is obtained based on the number of pages, an image size, and an image interval.

6. The image forming apparatus according to claim 4, wherein the at least one processor causes the image forming apparatus to (1) obtain the a roll length based on the maximum roll diameter, the maximum roll weight, and the maximum roll length, and (2) obtain the number of rolls by dividing the print length by the obtained roll length.

7. The image forming apparatus according to claim 6, wherein the at least one processor causes the image forming apparatus to (1) obtain candidates for the roll length from each of the maximum roll diameter and the maximum roll weight, and (2) obtain one of the obtained candidates and the maximum roll length that satisfies a condition as the roll length to obtain the number of rolls.

8. The image forming apparatus according to claim 7, wherein the one of the obtained candidates and the maximum roll length that satisfies the condition is the shortest of the obtained candidates and the maximum roll length.

9. The image forming apparatus according to claim 2, wherein the at least one processor causes the image forming apparatus to (1) perform control so as to display a first screen including a list of jobs, and (2) set the divider region in the group of images that has been designated by a job selected from the list.

10. The image forming apparatus according to claim 9, wherein the at least one processor causes the image forming apparatus to, upon accepting a first instruction on the first screen, (1) perform control so as to display a second screen capable of accepting the print information, and (2) set the divider region in the group of images designated by the job, based on the print information accepted on the second screen.

11. The image forming apparatus according to claim 10, wherein the at least one processor causes the image forming apparatus to set the divider region as a result of accepting an instruction for obtaining the number of rolls on the second screen.

12. The image forming apparatus according to claim 9, wherein upon accepting a second instruction on the first screen, the at least one processor causes the image forming apparatus to perform control so as to display the screen on which the information of the group of images corresponding to each of rolls in the obtained number of rolls can be designated.

13. The image forming apparatus according to claim 1, wherein the information of the group of images corresponding to each of the rolls in the obtained number of rolls includes the number of pages.

14. The image forming apparatus according to claim 1, wherein the at least one processor causes the image forming apparatus to perform control so as to print the divider region distinguishably.

15. The image forming apparatus according to claim 1, wherein the group of images is a group of labels.

16. A method comprising:
in a case where rolls are divided from a roll-shaped printing medium, obtaining a number of rolls based on specification information of a roll which is able to be provided in a post-processing device;
performing control so as to display a screen on which can be designated information of a group of images, among a group of images designated by a job, corresponding to each of rolls in the obtained number of rolls;
setting a divider region in the group of images designated by the job based on the information of the group of images designated on the screen, the divider region being for dividing the roll-shaped printing medium into the rolls in the obtained number of rolls; and
printing, on the roll-shaped printing medium, the group of images designated by the job in which the set divider region has been reflected,
wherein information of a print length, a print weight, or a diameter of a roll sheet is displayed together with the information of the group of images corresponding to each of the rolls in the obtained number of rolls.

* * * * *